United States Patent
Takamoto et al.

[11] Patent Number: 5,726,890
[45] Date of Patent: *Mar. 10, 1998

[54] CONTROL APPARATUS FOR ELECTRIC VEHICLE

[75] Inventors: Yuusuke Takamoto; Ryoso Masaki, both of Hitachi; Sanshiro Obara, Tokai-mura; Satoru Kaneko, Hitachi, all of Japan

[73] Assignee: Hitachi, Ltd., Japan

[*] Notice: The term of this patent shall not extend beyond the expiration date of Pat. No. 5,467,275.

[21] Appl. No.: 523,934

[22] Filed: Sep. 6, 1995

Related U.S. Application Data

[63] Continuation of Ser. No. 33,742, Mar. 19, 1993, Pat. No. 5,467,275.

[30] Foreign Application Priority Data

Mar. 19, 1992 [JP] Japan ......... 4-63143

[51] Int. Cl.[6] ......... B60L 15/34
[52] U.S. Cl. ......... 364/426.01; 364/424.02; 318/587
[58] Field of Search ......... 364/426.01, 424.01, 364/424.02; 180/65 R, 167, 165; 318/429, 254, 258, 587; 104/138.2

[56] References Cited

U.S. PATENT DOCUMENTS

| | | | |
|---|---|---|---|
| 3,915,251 | 10/1975 | Kassekert et al. | 180/65 R |
| 4,598,240 | 7/1986 | Gale et al. | 318/429 |
| 4,698,562 | 10/1987 | Gale et al. | 318/254 |
| 4,804,893 | 2/1989 | Melocik | 318/258 |
| 4,862,808 | 9/1989 | Hedgcoxe et al. | 104/138.2 |
| 5,070,959 | 12/1991 | Grabowski | 180/167 |
| 5,155,681 | 10/1992 | Aoki et al. | 364/424.01 |
| 5,376,869 | 12/1994 | Konrad | 318/587 |
| 5,465,806 | 11/1995 | Higasa et al. | 180/165 |
| 5,467,275 | 11/1995 | Takamoto et al. | 364/426.01 |

FOREIGN PATENT DOCUMENTS

| | | |
|---|---|---|
| 1-96701 | 6/1989 | Japan . |
| 2-65604 | 3/1990 | Japan . |
| 2-299959 | 12/1990 | Japan . |
| 5-252612 | 9/1993 | Japan . |

*Primary Examiner*—Kevin J. Teska
*Assistant Examiner*—Russell W. Frejd
*Attorney, Agent, or Firm*—Evenson, McKeown, Edwards & Lenahan P.L.L.C.

[57] ABSTRACT

An electric vehicle control unit capable of position control so that the vehicle can be held in its stop position without vibration, even if an operator does not keep the brake pressed. The control circuit of the electric vehicle comprises a speed/torque instruction generation circuit, a position control selection circuit, a position instruction generation circuit and a motor control circuit. When the vehicle stops, control of the motor is changed from speed or torque control to position control.

11 Claims, 16 Drawing Sheets

TA* : ACCELERATION TORQUE INSTRUCTION
TB* : DECELERATION TORQUE INSTRUCTION
T*  : TORQUE INSTRUCTION
k4  : POSITIVE CONSTANT
k5  : NEGATIVE CONSTANT

CONTROL APPARATUS FOR ELECTRIC VEHICLE

This application is a continuation of application Ser. No. 08/033,742, filed Mar. 19, 1993 now U.S. Pat No. 5,467,275.

BACKGROUND OF THE INVENTION

This invention relates to an apparatus for controlling the operation of an electric vehicle.

In prior art electric vehicle stop means, such as described in Japanese patent No. 2-65604, it is well known that brake torque is generated in the drive motor to hold the vehicle in a stop, and to help stop the vehicle on a slope. In this arrangement, such torque is always generated to prevent the vehicle from sliding down the hill.

Japanese patent No. 53-20268 discloses an ultrasonic sensor arrangement for detecting the approach of a vehicle, such as a fork lift, to within a specified distance from a load. In this device, a pulse generator is used to sense the distance between the vehicle and load, and to stop the vehicle at a specified distance from the load.

In the prior art control devices, when stopping an electric vehicle on a slope, the operator must apply sufficient braking force mechanically by means of a brake. If insufficient mechanical braking force is applied, an undesirable vibration results from switching of the motor between backward and forward torques. Although such vibration diminishes and stops with the passage of time, the actual stop position depends on the gradient of the slope, which is a problem.

Although the above mentioned prior art devices can stop a traveling vehicle at a specified position, the possibility of motion of the vehicle after the stop is not considered, and if the vehicle stops on a slope, there still exists a problem of undesired movement of the vehicle after stopping. Moreover, the above two prior art devices also suffer from the disadvantage that an electric vehicle cannot be moved from an initial stop position to a desired second position and held there by a simple operation.

SUMMARY OF THE INVENTION

An object of the present invention therefore is to provide an electric vehicle which can be stopped at an arbitrary position, hold its stop position without additional intervention by the operator, move to a second desired position removed from the stop position, stop there and hold the second position.

Another object of this invention is to provide an electric vehicle that starts easily on a slope.

These and other objects and advantages are achieved by the control system according to the invention, which is equipped with an input device, into which an operator may easily enter a desired stop position. In response, the control system generates a torque to hold the vehicle in the desired position until the operator inputs a second desired position. Upon entry of such a second position, the control system causes the motor to generate such a torque as to move the vehicle from the initial position to the second position, and to hold that position.

According to the invention, if the vehicle is stopped during normal traveling by operation of the brake, the position of the vehicle is controlled to maintain a desired position as the stop position, and a torque corresponding to the stop condition in the motor is generated. Even if the vehicle stops and brake force is eliminated, the control system according to the invention can hold its stop position.

If the operator then subsequently inputs a different desired position, the latter is substituted for the initially inputted stopping position, and a torque is generated in the motor so that the electric vehicle travels to the newly entered desired position at a desired speed, and holds its position.

Other objects, advantages and novel features of the present invention will become apparent from the following detailed description of the invention when considered in conjunction with the accompanying drawings.

DETAILED DESCRIPTION OF THE DRAWINGS

Figure 1:
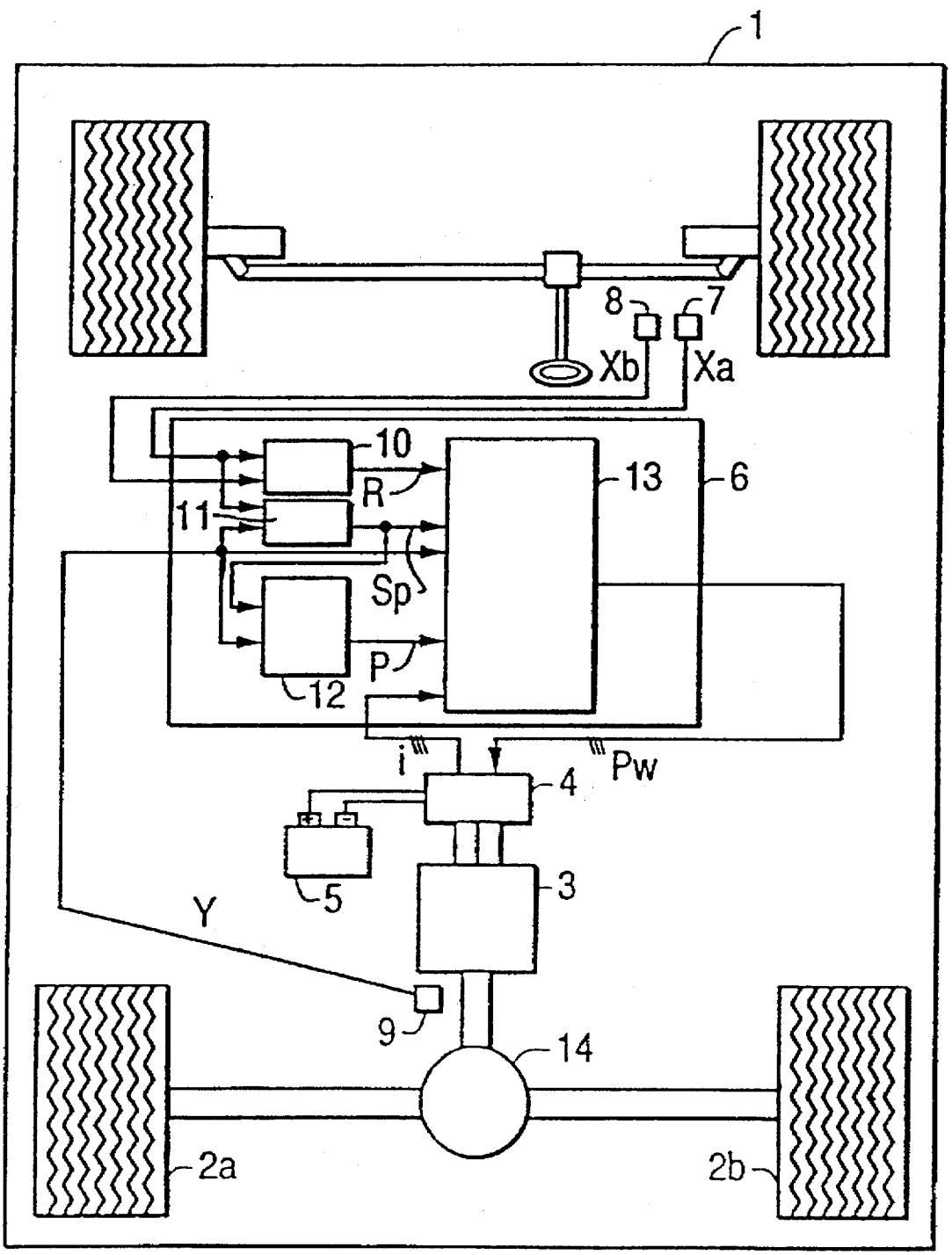
FIG. 1, is a schematic diagram of an embodiment of the invention, with a position control selection circuit and position instruction generation circuit provided on part of the control unit.

Referring now to FIG. 1, there is shown an embodiment of an electric vehicle which includes a position control system according to the invention. The right and left rear wheels 2a and 2b of the electric vehicle 1 are connected to the induction motor 3 through a differential 14, and driven by the inverter 4. The inverter is controlled by a pulse width modulated ("PWM") pulse Pw, and converts the power from the battery 5 to supply to the motor. The pulses Pw are generated by control unit 6 in response to the extent of the depression Xa of the accelerator pedal 7 by the operator, the amount of brake pressure Xb applied to the brake pedal 8, a pulse signal Y from the encoder 9 installed on the motor 3 and a current detection value i of the induction motor.

The control device 6 comprises a speed/torque instruction generation circuit 10, position control selection circuit 11, position instruction generation circuit 12 and motor control circuit 13. The speed/torque instruction generation device 10 calculates a speed or torque instruction value R to achieve desired operation of the motor 3, based on accelerator pedal depression Xa and brake pressure Xb, and outputs to the motor control circuit 13. For this purpose, the selection between speed control and torque control by speed/torque instruction generation device 10 may be made according to the preference of the vehicle operator, by means of a selection switch (not shown). The position control selection circuit 11 outputs a position control selection signal Sp through the motor control circuit 13, which causes the system to operate in the motor position control mode, in a manner described later. The position instruction generation circuit 12 calculates the position instruction value P in a manner described hereinbelow, and outputs to the motor control circuit 13. As described in detail later, the motor control circuit 13 usually controls either the speed or torque of the motor 3 in response to the speed or torque instruction value R; however, when motor position control is selected by the position control selection signal Sp, control circuit 13 controls the position according to the motor position instruction value P.

Figure 2:
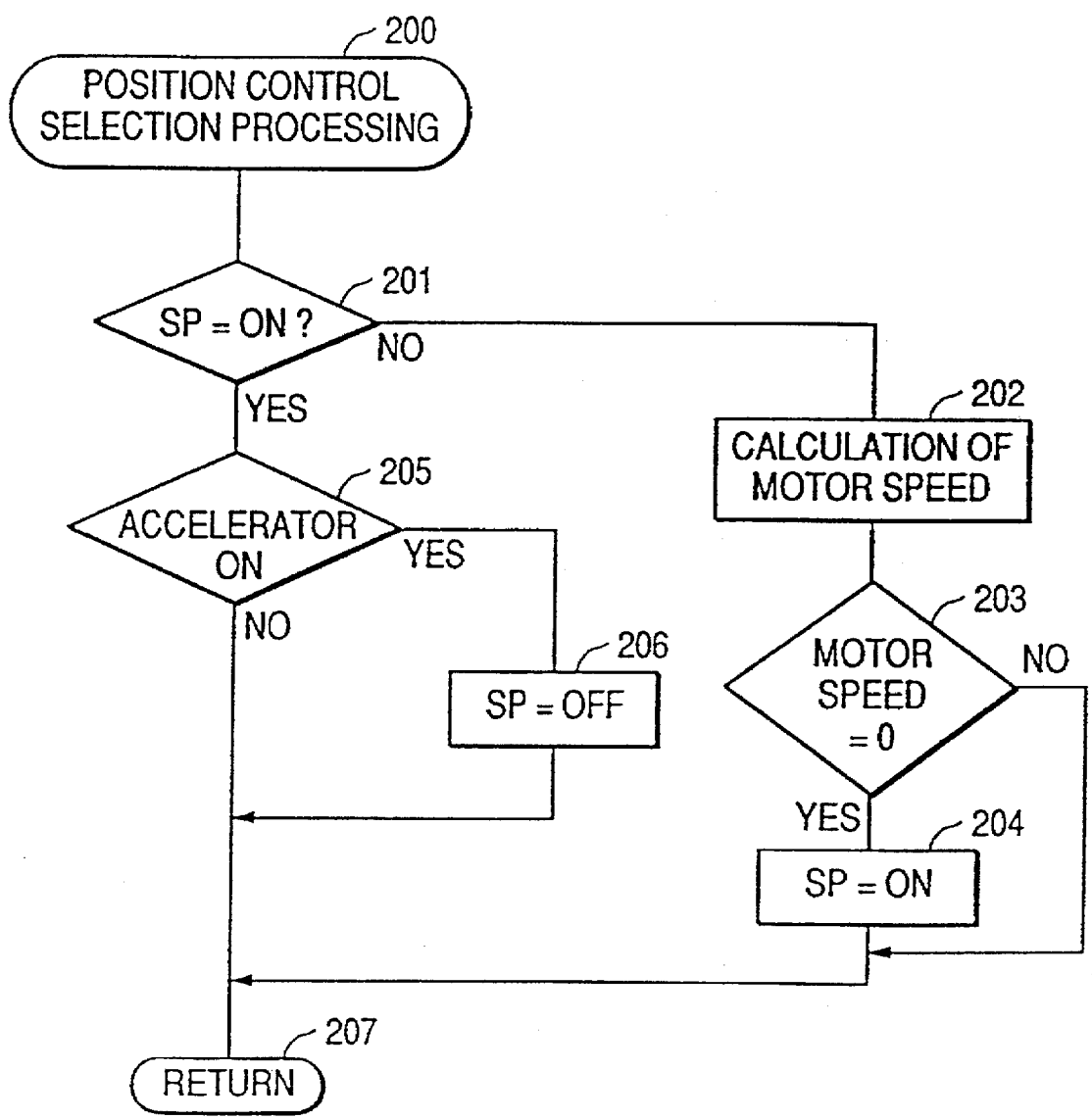
FIG. 2, is a flow chart which shows processing in the position control selection circuit of FIG. 1.

FIG. 2 is a flow chart which shows the processing steps performed in the position control selection circuit 11. Processing is started periodically (step 200) by a microcomputer operating system (OS) at fixed time intervals. First, it is determined whether the signal Sp is ON or OFF in order to judge whether the vehicle is currently under position control (step 201). When position control is not being done, motor speed is calculated from the encoder pulse signal Y (step 202) to judge whether the motor speed is 0 (step 203). When the motor speed is 0, the signal Sp is turned ON (step 204), and position control is initiated. During position control (Sp is ON in step 201), a determination is made whether or not the accelerator pedal is turned ON (step 205), and when it is, the signal Sp is turned OFF to stop position control (step 206). Then, a return instruction (step 207) is dispatched and a single iteration of the position control selection processing is completed.

Figure 3A:
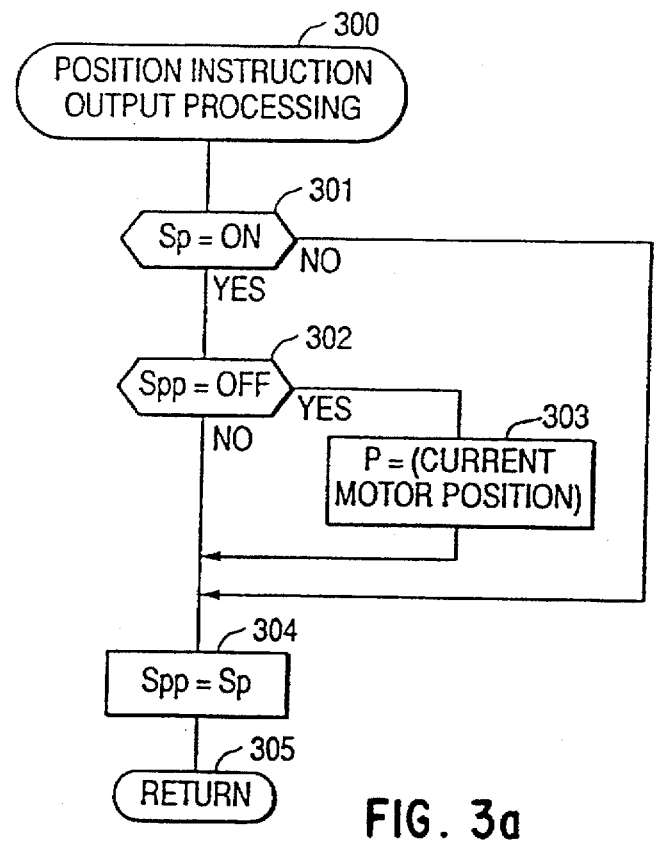
FIGS. 3(a–c), are flow charts which shows processing in the position instruction generation circuit of FIG. 1.

FIG. 3(a) shows a flow chart of the processing performed in the position instruction generating circuit 12. Processing is periodically started (step 300) by the microcomputer operating system (OS) at fixed time intervals. First, it is determined whether the signal Sp output from the position control selection processing circuit (FIG. 2) is ON (step 301), and if so, whether the value Spp (the signal Sp at the previous sampling time) is OFF (step 302). When Spp is OFF, it can be concluded that the signal Sp has at that moment changed from OFF to ON (vehicle has just come to a stop), and the present motor position is then determined from the encoder pulse signal Y and output as the position instruction value P for position control (step 303). In step 304, the value of the signal Sp is stored as the variable Spp for next sampling. Then, a return instruction (step 305) is dispatched, and a single iteration of the position instruction output processing is completed.

Figure 3B:
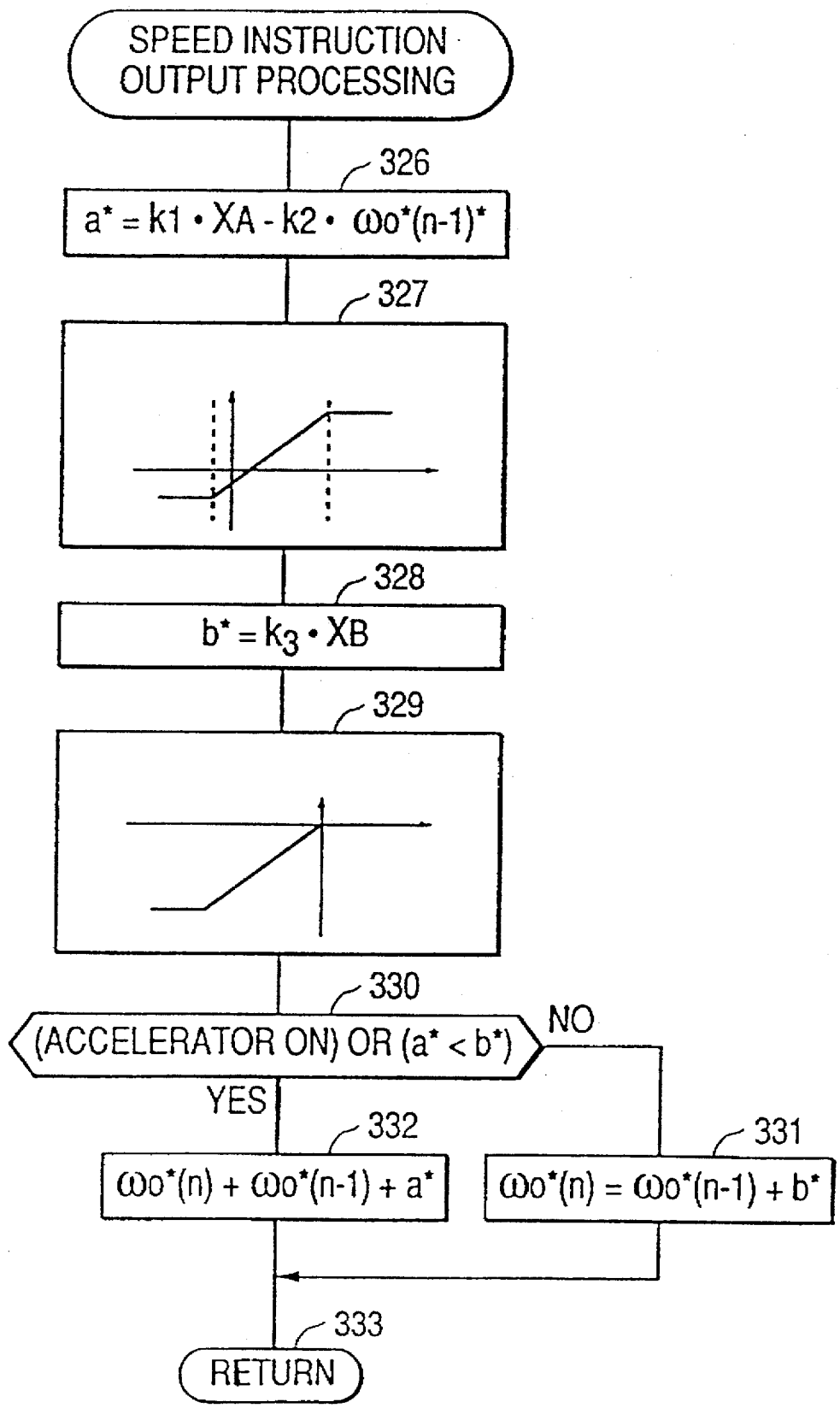
Figure 3C:
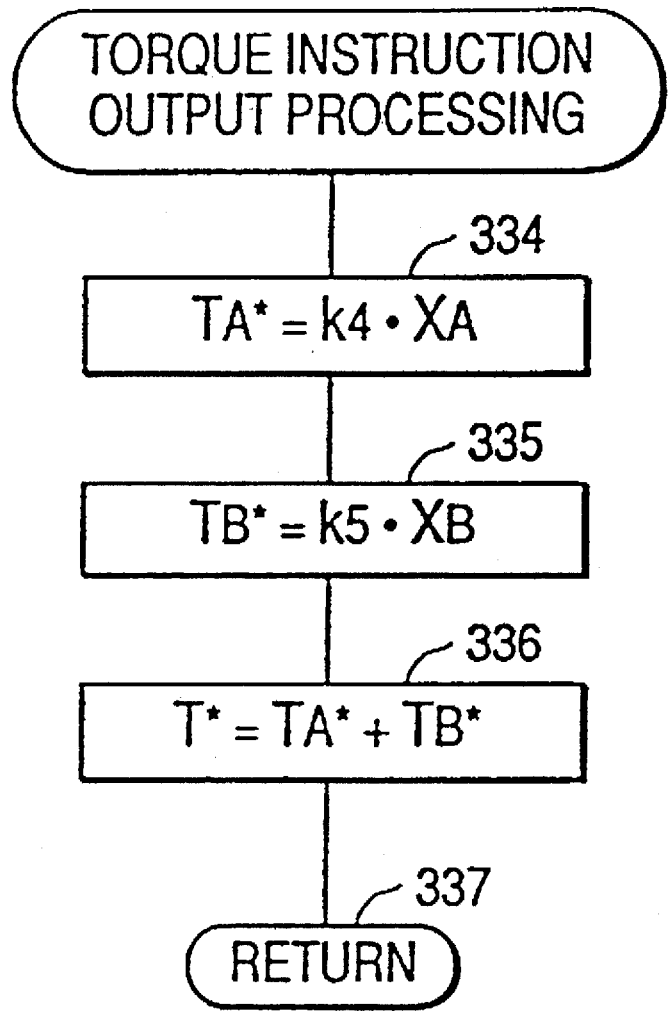

FIGS. 3(b) and 3(c) are flow charts which show the processing performed by the speed/torque instruction generating circuit 10. FIG. 3(b) shows that the speed instruction $\omega_0^*$ is based on a comparison of acceleration and deceleration signals derived from the position of the accelerator and brake pedals, respectively. First, in sampling n, an acceleration signal a* is calculated at step 326 as the difference between the desired speed (indicated by a positive constant $k_1$ times the amount of accelerator depression $X_A$) and the immediately preceding speed instruction in sampling n−1 ($\omega_o(n-1)^*$) (also multiplied by a positive constant $k_2$). Next, in step 327, the value of a* is limited in both the positive and negative directions, so that the output value of a* cannot exceed predetermined levels, for safety reasons. A deceleration signal is then calculated (step 328) as a negative constant $k_3$ times the amount of brake pedal depression $X_B$, and limited in step 329. In step 330, if either the accelerator is ON, or the calculated value for the acceleration signal a* is less than the value of the deceleration signal b*, then the output speed instruction for the nth sampling $w_o(n)$ is fixed at the algebraic sum of the previous speed instruction $\omega_o(n-1)^*$ and the calculated acceleration signal a* (step 332). (Note that a* takes on a negative value when the accelerator depression $X_A$ indicates a speed which is less than the previous speed instruction $\omega_o(n-1)^*$.) If, on the other hand, neither the accelerator is ON nor is a* <b*, the output speed instruction is determined as the algebraic sum of the previous speed instruction and the deceleration signal b* (step 331). At step 333 the processing of a single sampling is completed and the process is repeated.

FIG. 3(c) shows that the torque instruction is calculated as the algebraic sum of acceleration and deceleration torque signals based on the positions of the accelerator and brake pedals, $X_A$ and $X_B$, respectively. At step 334, an acceleration torque signal $T_A^*$ is calculated as a positive constant $K_4$ times the accelerator position $X_A$, and at step 335 a deceleration torque signal $T_B^*$ is calculated as a negative constant times the brake pedal position $X_B$. The quantities $T_A^*$ and $T_B^*$ are summed at step 336 and the result is output as the torque instruction T*. The process is then repeated at step 337.

Figure 4:
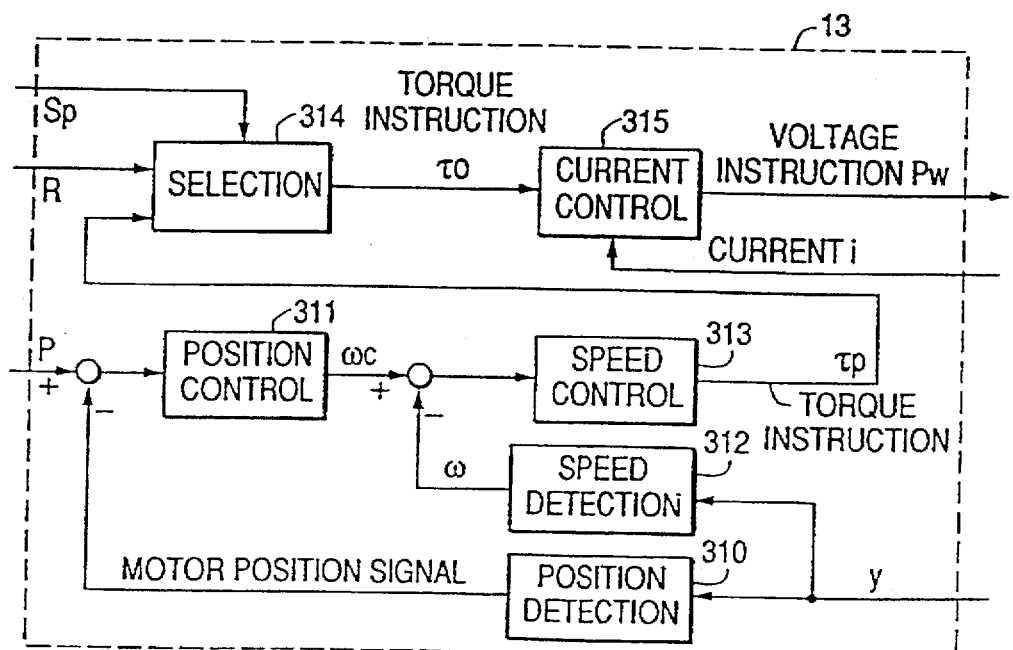
FIG. 4, is a schematic diagram of the motor control circuit of FIG. 1.

FIG. 4 is a block diagram of motor control circuit 13, which illustrates the case where the speed/torque instruction generation device 10 dispatches a torque instruction value R. In response to the encoder signal Y, position detection circuit 310 generates a motor position signal, which is compared with position instruction value P, and position control 311 is calculated to output a speed instruction value $\omega_C$. (The maximum value of the speed instruction is limited for safety reasons.) The motor speed value $\omega$ derived from the speed detection circuit 312 is compared with the speed instruction value $\omega_C$, and speed control is calculated 313 to output a torque instruction value τP. When the position control selection signal Sp is ON, the switching circuit 314 outputs the torque instruction value τP as the torque instruction value τ0, and when Sp is OFF, the torque instruction value R obtained from the speed/torque instruction generation device 10 is output as the torque instruction value τ0. Current control 315 receives the torque instruction value τ0, as well as the value for the current i flowing to the induction motor 3, and generates a voltage control instruction in the form of pulses Pw.

Figure 5:
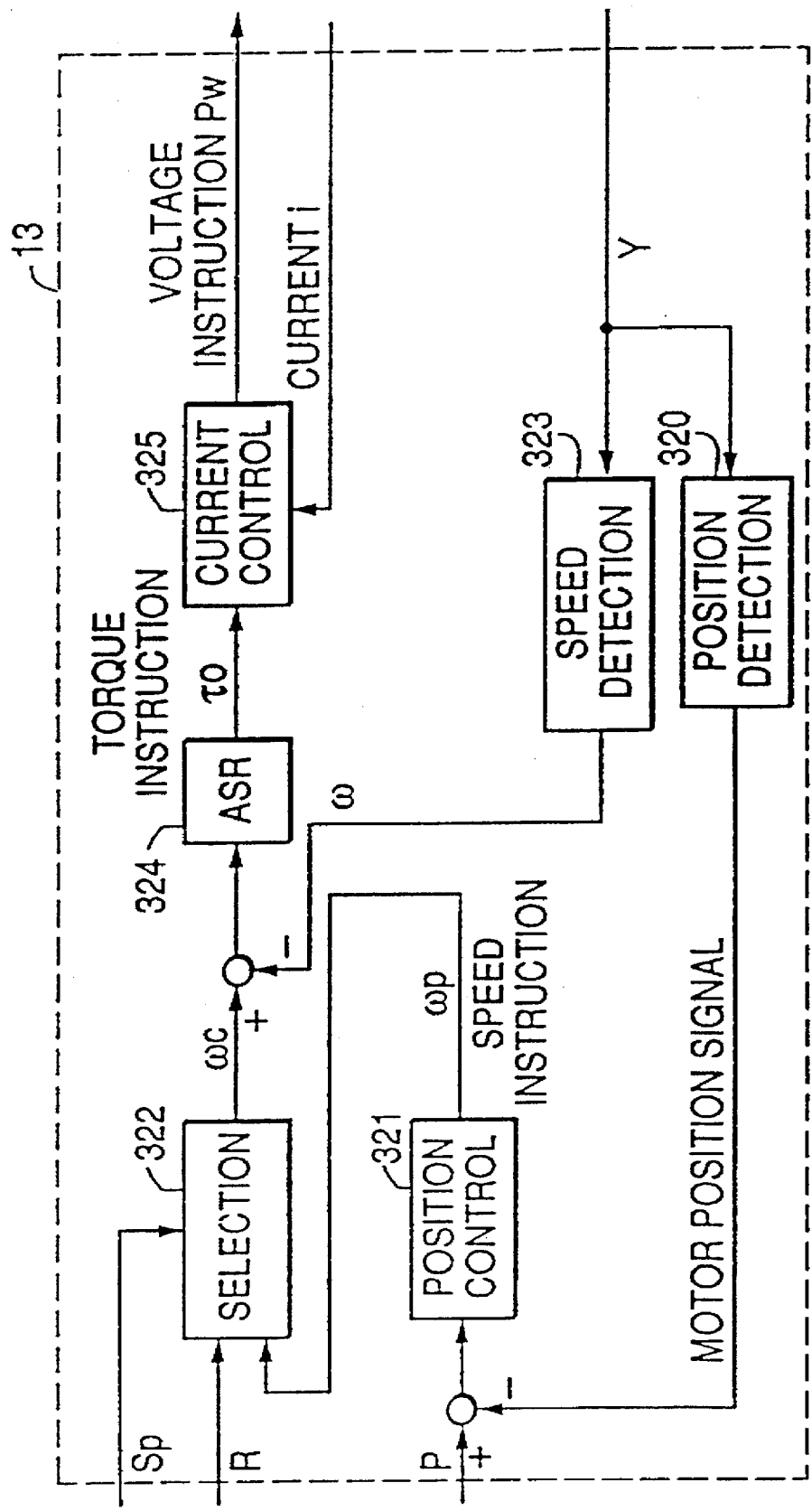
FIG. 5, is a schematic diagram of the motor control circuit of FIG. 1 in a different operating made.

FIG. 5 is a block diagram of motor control circuit 13, which is analogous to that of FIG. 4, except that in FIG. 5 the speed/torque instruction generation device 10 dispatches a speed instruction value R, as opposed to the torque instruction value in FIG. 4. Position detection circuit 320 generates a motor position signal in response to the encoder signal Y. The motor position signal is then compared with position instruction value P, and position control 321 is calculated to output a speed instruction value $\omega_P$, (which, as before, is limited for safety reasons). When the position control selection signal Sp is ON, the switching circuit 322 outputs $\omega_P$ as the speed instruction value $\omega_C$, and when Sp is OFF the speed instruction value R obtained from the speed/torque instruction generation device 10 is output as the speed instruction value $\omega_C$. The motor speed value $\omega$ obtained from the speed detection circuit 323 is then compared with the speed instruction value $\omega_C$, and ASR section 324 derives a torque instruction value τ0, which is equal to a proportionality constant $K_p$ times the difference $\omega_E$ between $\omega_C$ and $\omega$. Alternatively, $\tau 0$ may be proportional to the sum of $\omega E$ and an integration factor Ie, according to the following formula:

$$\omega_E = \omega_C - \omega$$

$$Ie(N) = Ie(N-1) + \omega_E$$

$$\tau_o = K_p \left( \omega e + \frac{Ie(N)}{T_I} \right)$$

Current control 325 receives the torque instruction value $\tau 0$ and a value for the current i flowing to the induction motor 3, and generates a voltage control instruction in the form of pulses Pw.

By using the configuration show in FIG. 1 and the processing steps shown in FIGS. 2, 3, 4 and 5, when the vehicle stops, the motor control is changed from torque control to position control, so that the position instruction conforms to the motor position at the time when the vehicle stops. Thus, if an operator releases the brakes after the vehicle stops, the vehicle will be held there without moving backward and forward. When the operator presses the accelerator pedal during a stop in which the vehicle is maintained in position control, position control is canceled so that the vehicle can be restored to normal speed traveling or traveling by torque control.

Figure 6:
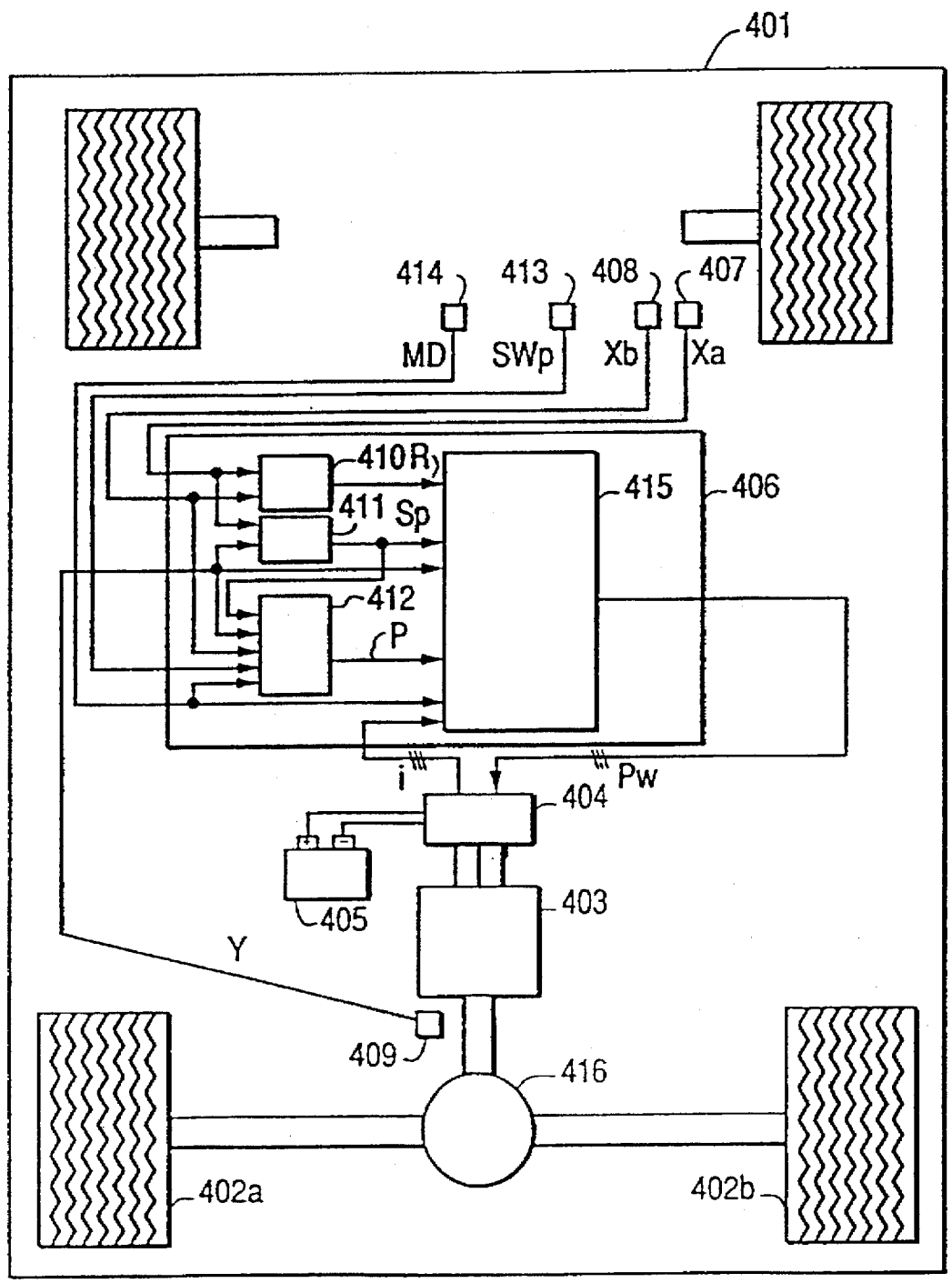
FIG. 6, is a schematic diagram of another embodiment of the invention.

Another embodiment of the in invention is show in FIG. 6. As in FIG. 1, the right and left rear wheels 402a and 402b of the electric vehicle 401 are connected to the induction motor 403 through a differential 416 and driven by the inverter 404. Similarly, the inverter is controlled by the PWM pulses Pw, and converts the power from the battery 405 to supply to the motor. The control unit 406 generates PWM pulses Pw in response to the accelerator pedal depression value Xa received from the accelerator pedal 407, brake pressure value Xb obtained from the brake pedal 408, pulse signal Y from the encoder 409 installed on the motor 403, traveling distance specification signal SWp from a traveling distance specification switch 413, mode signal MD from the backward/forward selection lever 414 and current detection value i of the induction motor 403.

The control device 406 comprises a speed/torque instruction generation circuit 410, position control selection circuit 411, position instruction generation circuit 412 and motor control circuit 415. The speed/torque instruction generation device 410 calculates a speed or torque instruction value R to achieve desired operation of the motor 403, based on accelerator pedal depression Xa and brake pressure Xb, and outputs the value R to the motor control circuit 415. The position control selection circuit 411 selects the motor position control mode according to the method shown in FIG. 2 and outputs position control selection signal Sp to the motor control circuit 415. The position instruction generation circuit 412 calculates the position instruction value P in a manner described hereinbelow, and outputs to the motor control circuit 415. As shown in FIGS. 4 and 5, the motor control circuit 415 usually controls either the speed or the torque of the motor 403 in response the speed or torque instruction value R; however, when motor position control is selected by position control selection signal Sp, control unit 415 controls the position according to motor position instruction value P.

Figure 7:
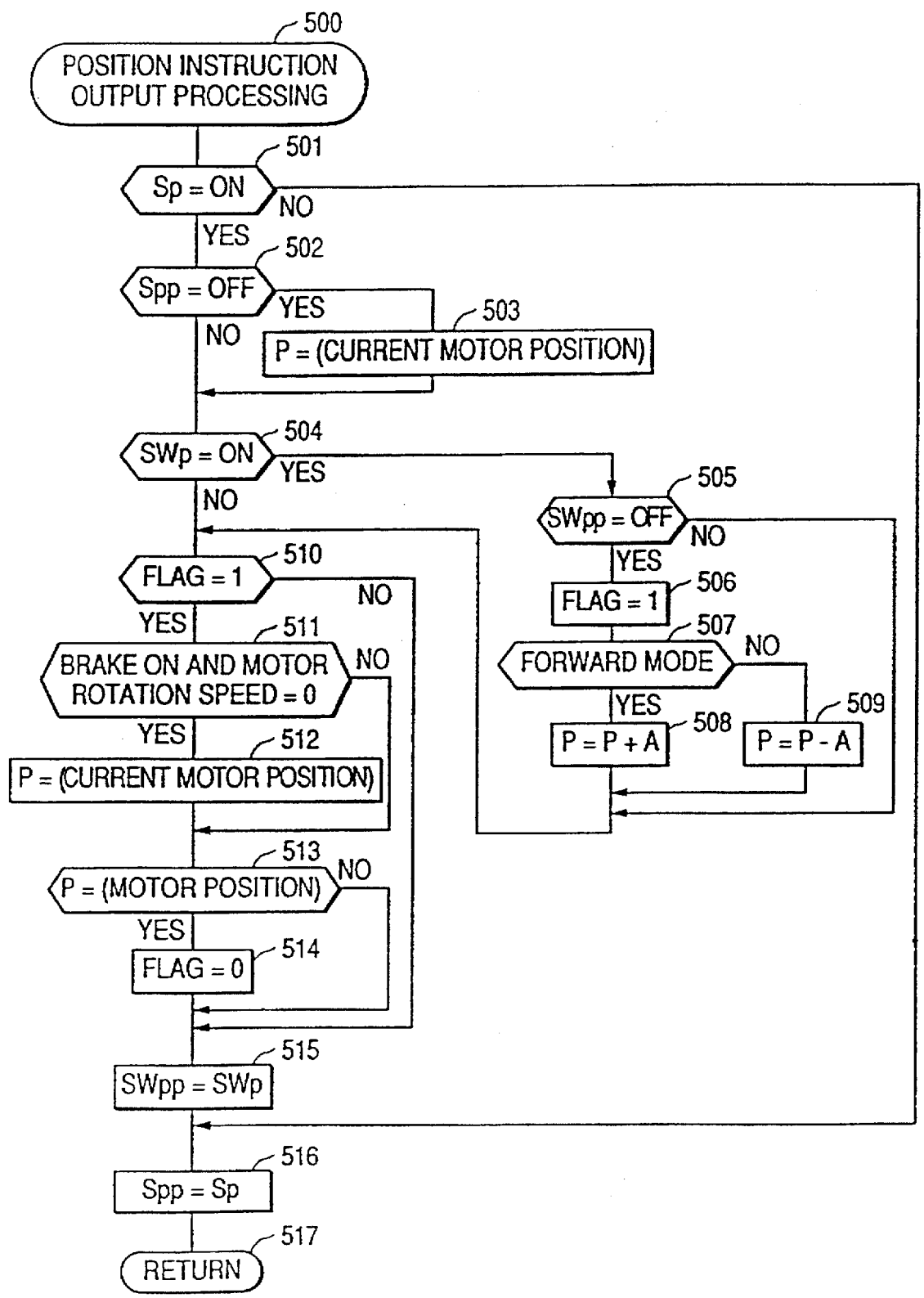
FIG. 7, is a flow chart which shows the processing in the position instruction generation circuit of FIG. 6.

FIG. 7 shows a flow chart of the processing steps performed in the position instruction generation circuit 412. Processing is initiated at fixed intervals (step 500) by microcomputer operating system (OS). First it is determined whether the signal Sp output from the position control selection processing circuit (FIG. 2) is ON (step 501), and if so, whether the value Spp (the signal Sp at the previous sampling time) is OFF (step 502). When Spp is OFF, it can be concluded that the signal Sp has at that moment changed from OFF to ON (the vehicle has just come to stop), and a motor position is then determined from the encoder pulse signal Y and output as the position instruction value P for position control (step 503).

Next, it is determined whether the traveling distance specification signal SWp from the traveling distance specification switch 413 is ON (step 504). (When the traveling distance specification switch 413 is pressed the traveling distance specification signal SWp is ON, and the position instruction value P of the motor changes from the position where the vehicle stops, to a specified position several meters forward or backward). When the signal SWp is ON, a further determination is made (step 505) whether SWpp (the value SWp at the previous sampling) is OFF. When SWpp is OFF (switch 613 was not depressed at the previous sampling), it can be considered that the signal SWp has at that moment changed from OFF to ON. Thus, FLAG=1 is set indicating automatic traveling (step 506); and when forward is selected by the mode signal MD from the forward/backward selection lever 414, the instruction A is added to the position instruction value P for position control, or when backward is selected, the instruction value A is subtracted from the position instruction value P (steps 507, 508, 509). (The instruction value A represents a change of motor position corresponding to the vehicle's traveling several meters.)

Next, it is queried FLAG=1 (that is, the vehicle is on automatic traveling) (step 510). If so, and if the brake is ON and the motor speed is 0, motor position is calculated from the encoder pulse signal Y,and is output as the position instruction value P for position control (steps 511, 512). It is then determined whether the motor position instruction value P is equal to the current motor position (step 513), and if so, automatic traveling is terminated and FLAG =0 is set (step 514). The steps 510, 511, 512, 513 and 514 indicate that automatic traveling by position control is terminated when the vehicle is stopped by intensifying the braking force, and the vehicle travels at a specified distance so that the motor position instruction value P and the motor position become equal to each other. In step 515, the signal SWp value is stored as the variable SWpp for next sampling. In step 516, the signal Sp is stored as the variable Spp for next sampling. Then a return instruction (step 517) is dispatched, and a single iteration of the position instruction output processing is completed.

By using the configuration shown in FIG. 6 and the processing steps shown in FIGS. 2,4 5 and 7, when the vehicle stops, the motor control is switched from torque control to position control, and the position instruction is established to coincide with motor position when the vehicle stops. Thus, even if an operator releases the brakes after the vehicle stops the vehicle can remain at the stopping position without moving forward or backward. If the traveling distance specification switch 413 is pressed during position control, the vehicle automatically travels forward or backward a specified distance. It should be noted that the traveling distance is determined by the number of times that the switch 413 is pressed. Thus, assuming that the vehicle travels 1 meter for a single press of the switch, if the operator wants to move the vehicle 5 m ahead, he needs only press the switch 413 five times. For such automatic traveling, the speed of the vehicle is restricted to a very low limit for safety reasons.

Automatic traveling can be terminated when the vehicle is stopped by intensifying the force applied to the brakes, whereupon the vehicle travels a specified distance and remains where the automatic traveling is terminated. If the operator presses the accelerator pedal during a stop or traveling by position control, position control is canceled, so that the vehicle can be restored to normal speed traveling or traveling by torque control.

Figure 8:
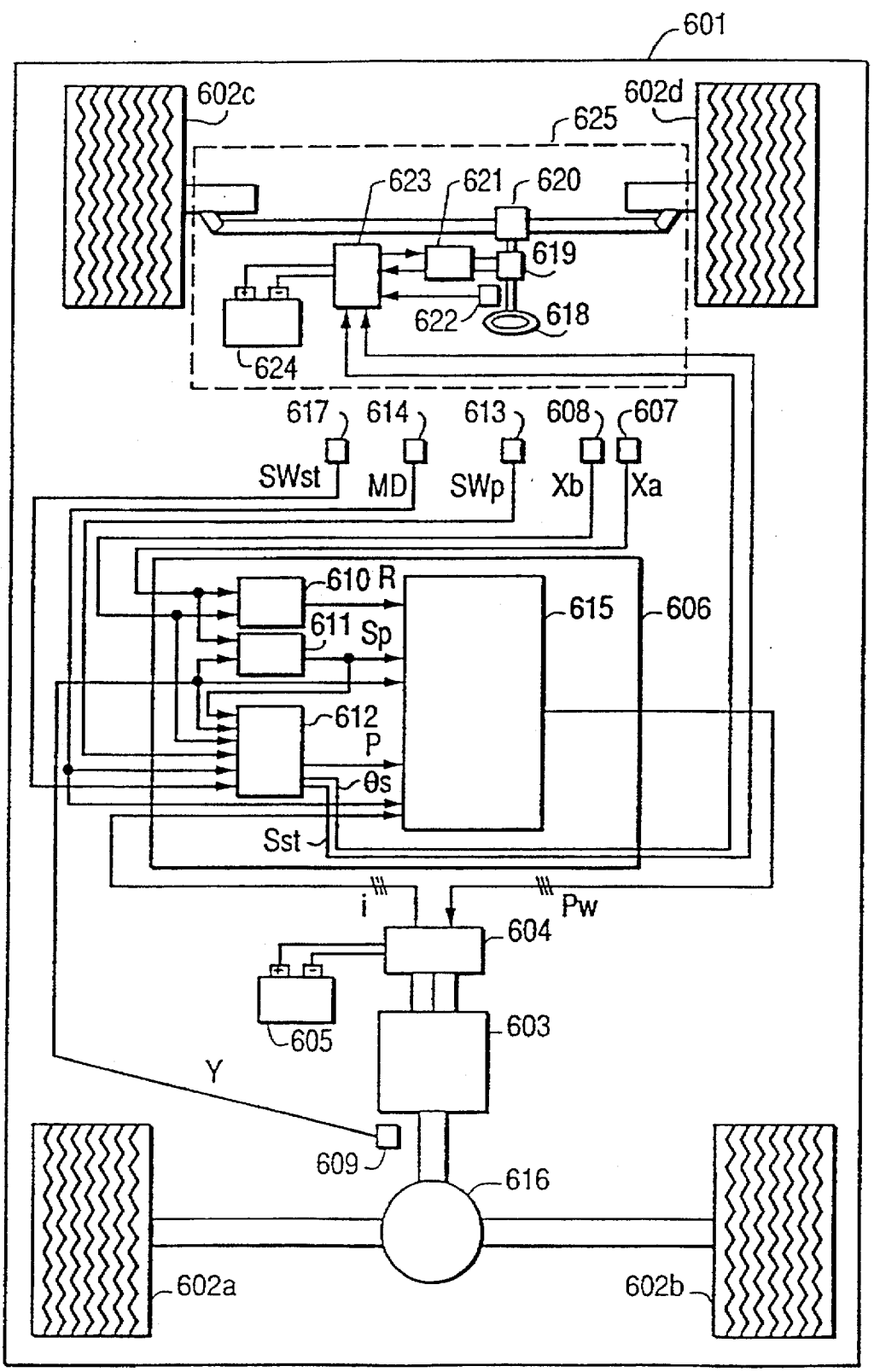
FIG. 8, is a schematic diagram of still another embodiment of the invention.

Still another embodiment of this invention is shown in FIG. 8. The right and left rear wheels 602a and 602b of the electric vehicle 601 are connected to the induction motor 603 through a differential 616 driven by the inverter 604, which in turn is controlled by the PWM pulse Pw and converts the power from the battery 605 to supply the motor. The control unit 606 generates PWM pulses Pw in response to the accelerator pedal depression value Xa received from the accelerator pedal 607, brake pressure value Xb obtained from the brake pedal 608, pulse signals Y from the encoder 609 installed on the motor 603, traveling distance specification signal SWp from the traveling distance specification signal SWp from the traveling distance specification switch 613, mode signal MD from the backward/forward selection lever 614, automatic steering selection signal SWst from the automatic steering switch 617, and current detection value i of the induction motor.

The control device 606 comprises a speed/torque instruction generation circuit 610, position control selection circuit 611, position instruction generation circuit 612 and motor control circuit 615. The speed/torque instruction generation device 610 calculates a motor speed or torque instruction value R to achieve desired operation of the motor 603 based on accelerator pedal depression value Xa and brake pressure xb, and outputs to the motor control circuit 615. The position control selection circuit 611 selects the motor position control according to the method shown in FIG. 2, and outputs position control selection signal Sp to the motor control circuit 615. The position instruction generation circuit 612 calculates the position instruction value P in a manner described hereinbelow, and outputs to the motor control circuit 615. As shown in FIGS. 4 and 5, the motor control circuit 615 usually controls either the speed or the torque of the motor 603 in response to the speed or torque instruction value R; however, when motor position control is selected by position control selection signal Sp, control circuit 615 controls the motor position according to motor position instruction value P.

Position instruction generation circuit 612 outputs the steering angle control selection signal Sst and steering angle instruction Θs to the electric power steering unit 625 in a manner described below. Electric power steering section 625 comprises a steering wheel 618, gears 619 and 620, motor 621, torque sensor 622, motor control circuit 623 and battery 624. It controls the steering angle of the steering wheel according to the steering angle instruction Θs to steer the front wheels, only when the steering angle control selection signal Sst from the position instruction generation circuit 612 is ON. When the steering angle control selection signal Sst is OFF, the torque applied by the operator to control the steering wheel is detected by the torque sensor 622 to perform processing for electric power steering, and to assist the steering operation by motor torque.

Figure 9:
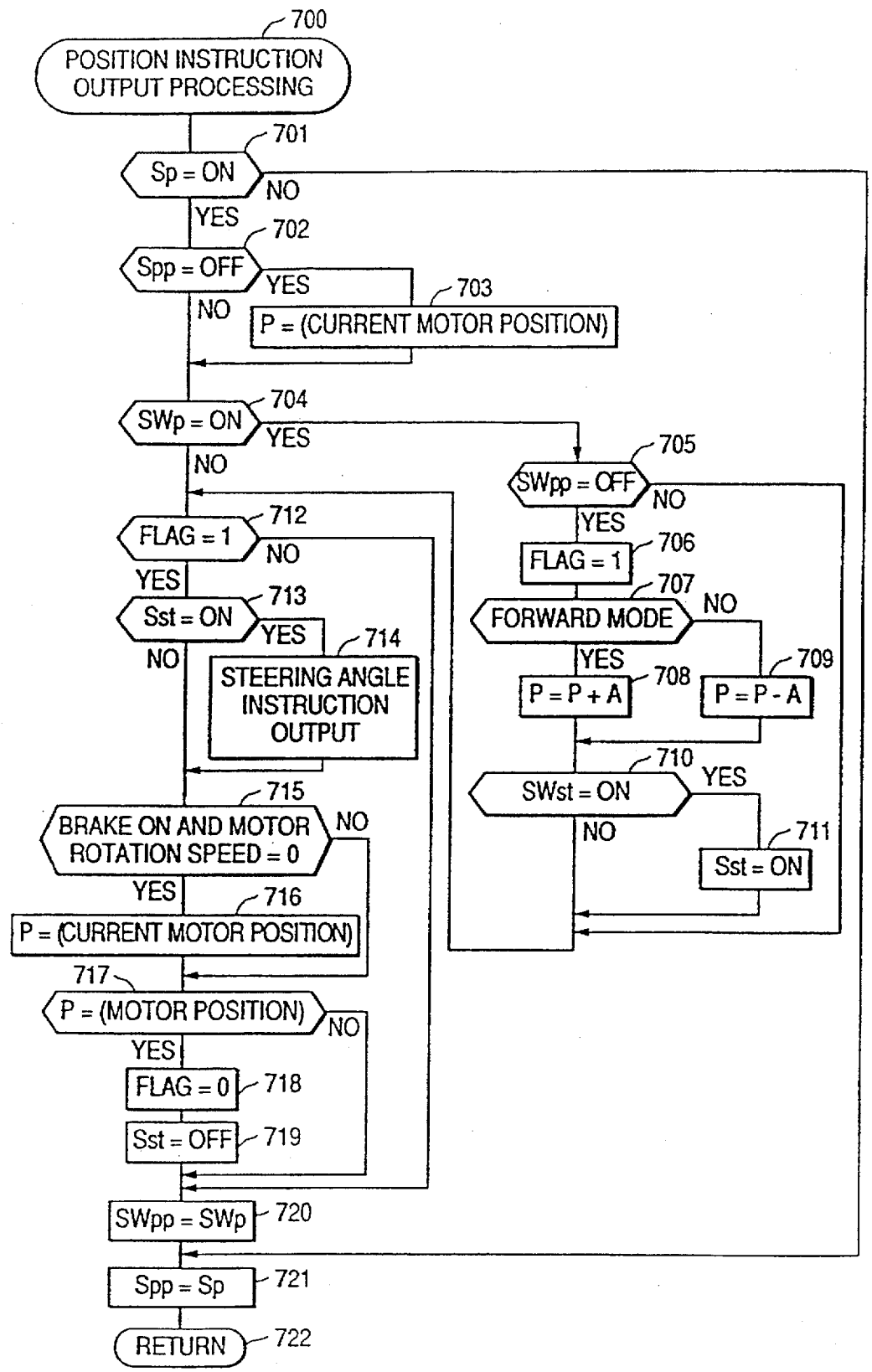
FIG. 9, is a flow chart which shows the processing in the position instruction generation circuit shown of FIG. 8.

FIG. 9 shows a flow chart of the processing steps performed in the position instruction generation circuit 612. Processing is initiated at fixed intervals (step 500) by microcomputer operating system (OS). First, it is determined whether the signal Sp output from the position control selection processing (FIG. 2) is ON (step 701), and if so, whether the value Spp (the signal Sp at the previous sampling time) is OFF (step 702). When Spp is OFF, it can be concluded that the signal Sp has at that moment changed from OFF to ON, and a motor position is then determined from the encoder pulse signal Y and output as the position instruction value P for position control (step 703).

Next, it is determined whether the traveling distance specification signal SWp from the traveling distance specification switch 613 is ON (step 704). (When traveling distance specification switch 613 is pressed, the traveling distance specification signal SWp is ON, and the position instruction value P of the motor is changed from the position where the vehicle stops, to a specified position several meters forward or backward.) When the signal SWp is ON a further determination (step 705) is made whether SWpp of the value SWp at the previous sampling time is OFF. When SWpp is OFF (switch 613 was not depressed at the last sampling time), it can be considered that the signal SWp has changed at that moment from OFF to ON. Thus, FLAG=1 is set, indicating automatic traveling (step 706); and when forward is selected by the mode signal MD from the forward/backward selection lever 614, the instruction A is added to the position instruction value P for position control, or when backward is selected, the instruction value A is subtracted from the position instruction value P (steps 707, 708, 709). (Here, the instruction value A represents a change of motor position corresponding to the vehicle's moving by several meters.) Further, a determination is made whether the automatic steering selection signal SWst from the automatic steering switch 617 is ON (step 710), and when it is, it is assumed that automatic steering is selected and the steering angle control selection signal Sst to the steering angle control section 625 is turned ON (step 711).

Figure 10:
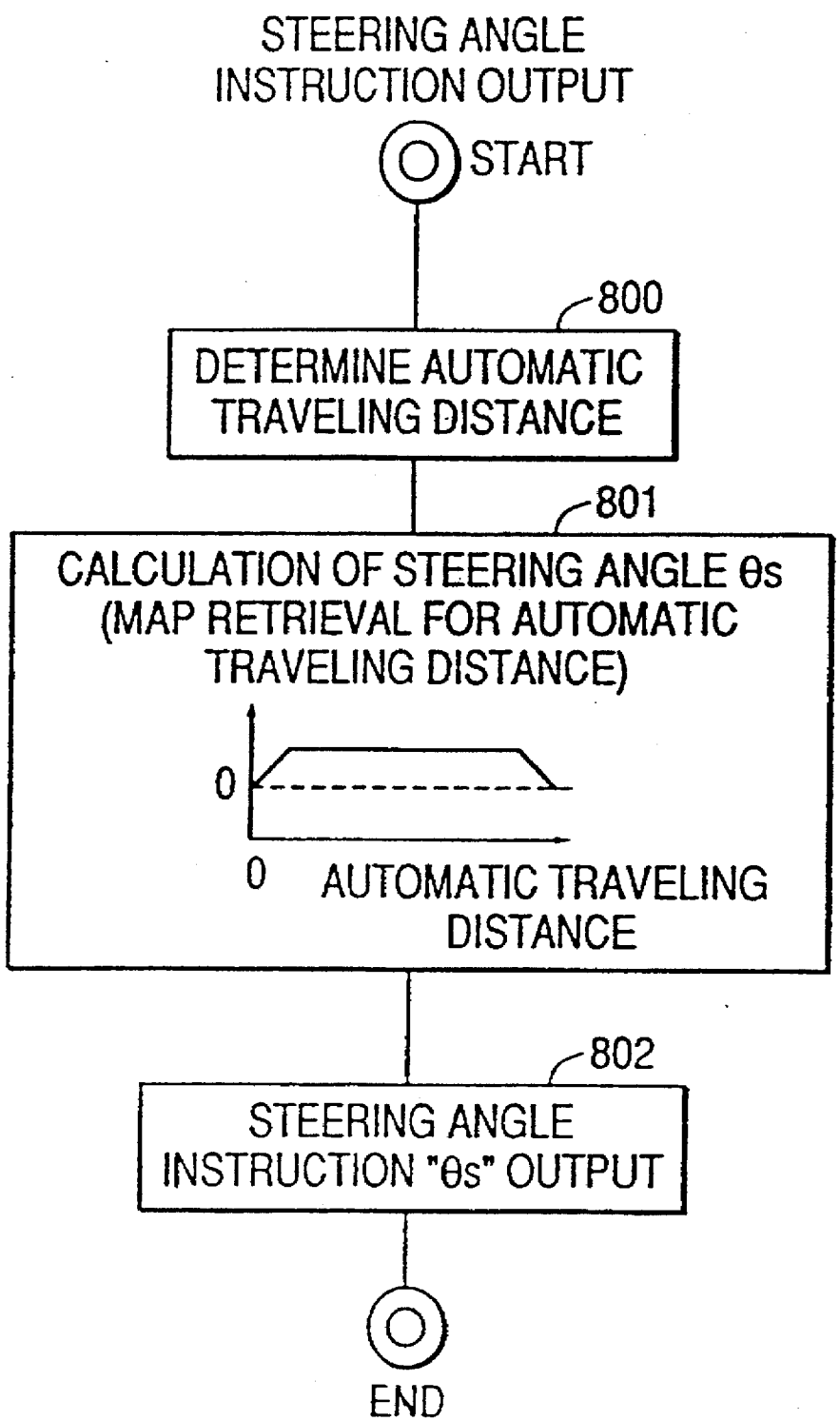
FIG. 10, is a flow chart which shows details of a portion of the processing in FIG. 9.

Next, it is queried whether FLAG=1 (that is, the vehicle is in the automatic traveling mode) (step 712). If so, and if the steering angle control selection signal Sst is ON (step 713), the steering angle instruction Θs is calculated and output (step 714). (FIG. 10 shows the details of the step 714.) When the brake is ON and motor speed is 0, motor position is calculated from the encoder pulse signal Y, and is output as the position instruction value for position control (steps 715, 716). It is then determined whether the motor position instruction value P is equal to the current motor position (step 717), and if so, automatic traveling is terminated, FLAG=0 is set, and the steering angle control selection signal Sst is turned OFF (steps 718, 719). The steps 712, 715, 716, 717, and 718 indicate that automatic traveling position control is terminated when the vehicle is stopped by intensifying the braking force, and the vehicle travels a specified distance so that the motor position instruction value P and the motor position become equal to each other. In step 720, the value of signal SWp is stored as the variable SWpp for next sampling, and in step 721, the signal Sp is stored as the variable Spp for next sampling. Then, a return instruction (step 722) is dispatched, and a single iteration of the position instruction output processing is completed.

FIG. 10 shows the details of the processing in step 714 of FIG. 9. First, the distance that the vehicle has moved by automatic traveling is determined (step 800) based on output signal Y from the encoder 9 on motor 3. (Initially, at the commencement of automatic traveling, this distance is zero.) Next, the steering angle instruction Θs is determined and output to the steering angle control section 625 (steps 801, 802); this is performed by means of a look-up table stored in a ROM, using the determined value for automatic traveling distance as a variable. This process is repeated at fixed time intervals during automatic traveling, until a desired position is attained.

The ROM is programmed during manufacturing to contain multiple automatic traveling patterns. In order to initiate the automatic traveling mode, the operator positions the vehicle at a known fixed reference point relative to a desired vehicle position (for example, a parking space). Thereafter, an appropriate automatic traveling pattern is selected, either by the operator or by the microcomputer. In the latter case, the selection is made on the basis of the ending position of the vehicle under control by the operator during a "learning" mode in a manner which will be understood by those skilled in the art.

By using the configuration show in FIG. 8 and the processing steps shown in FIGS. 2, 4, 5, 9, and 10, when the vehicle stops, the motor control is changed from torque control to position control, and the position instruction is established to coincide with the motor position at the time when the vehicle stops. Thus, even if an operator releases the brakes after the vehicle stops, the vehicle can remain there without moving backward and forward. Further, if the traveling distance specification switch 613 is pressed during position control, the vehicle automatically moves forward or backward by a specified distance. (For such automatic traveling, the speed of the vehicle is restricted for safety reasons to a very low limit.) If the traveling distance specification switch 613 is turned ON after the automatic steering switch 617 is turned ON, automatic steering can be done at the same time as automatic traveling, thus providing a simple method for automatically moving the vehicle into a garage for example. By preparing several maps of steering wheel angles and traveling distance, different garages or parking places can be handled.

Automatic traveling is terminated when the vehicle is stopped by intensifying the force applied to the brakes, whereupon the vehicle travels at a specified distance, so that it remains there at the position where its automatic traveling terminated. When the operator presses the accelerator pedal during a stop or traveling by position control, position control is canceled so that the vehicle can be restored to normal speed traveling or traveling by torque control.

Figure 11:
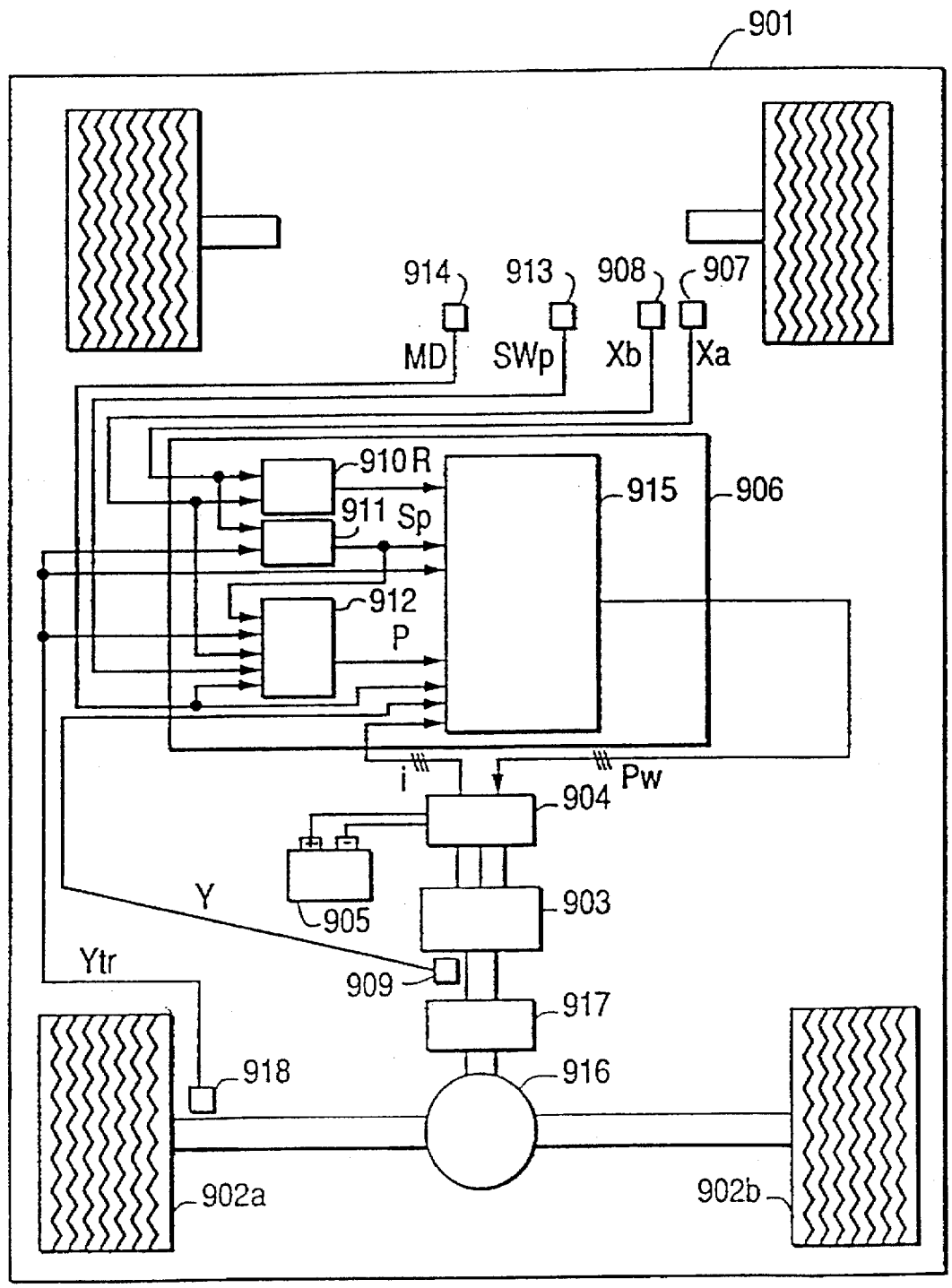
FIG. 11, is a schematic diagram of a further embodiment of this invention.

Still a further embodiment of this invention is illustrated in FIG. 11. The right and left rear wheels 902a and 902b of the electric vehicle 901 are connected to the induction motor 903 through a transmission 917 and a differential 916, and driven by the inverter 904, which in turn is controlled by the PWM pulse Pw, and converts the power from the battery 905 to supply the motor. The control unit 906 generates PWM pulse Pw in response to accelerator pedal depression value Xa received from the accelerator pedal 907, brake pressure value Xb obtained from the brake pedal 908, pulse signal Y from the encoder 909 installed on the motor 903, pulse signal Ytr from the encoder 918 installed on the left rear wheel, traveling distance specification signal SWp from the traveling distance specification switch 913, mode signal MD from the backward/forward selection lever 914 and current detection value i of the induction motor.

The control device 906 comprises a speed/torque instruction generation circuit 910, position control selection circuit 911, position instruction generation circuit 912 and motor control circuit 915. The speed/torque instruction generation circuit 910 calculates a motor speed or torque instruction value R to achieve desired operation of the motor 903, based on accelerator pedal depression value Xa and brake pressure value Xb and outputs to the motor control circuit 915. The position control selection circuit 911 selects the motor position control mode according to the method shown in FIG. 12, and outputs a position control selection signal Sp to the motor control circuit 915. Because the motor speed may be different from the wheel speed when motor torque is transmitted through the transmission 917, the wheel speed is calculated in this embodiment from a pulse Ytr from the encoder 918 installed on the wheel. When wheel speed is 0, position control selection circuit 911 selects position control.

Figure 13:
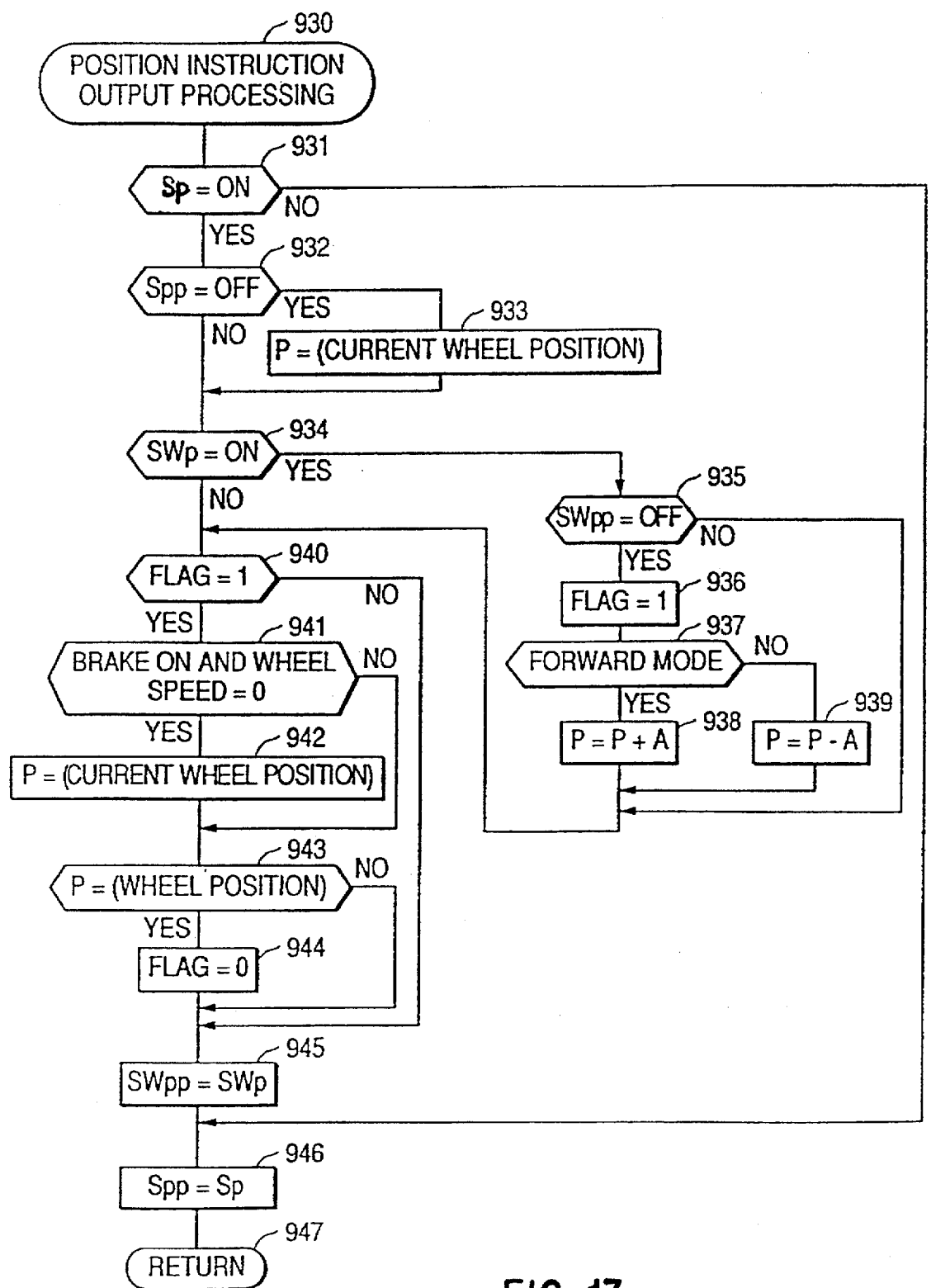
FIG. 13, is a flow chart which shows the processing in the position instruction generation circuit shown in FIG. 11.
Figure 14:
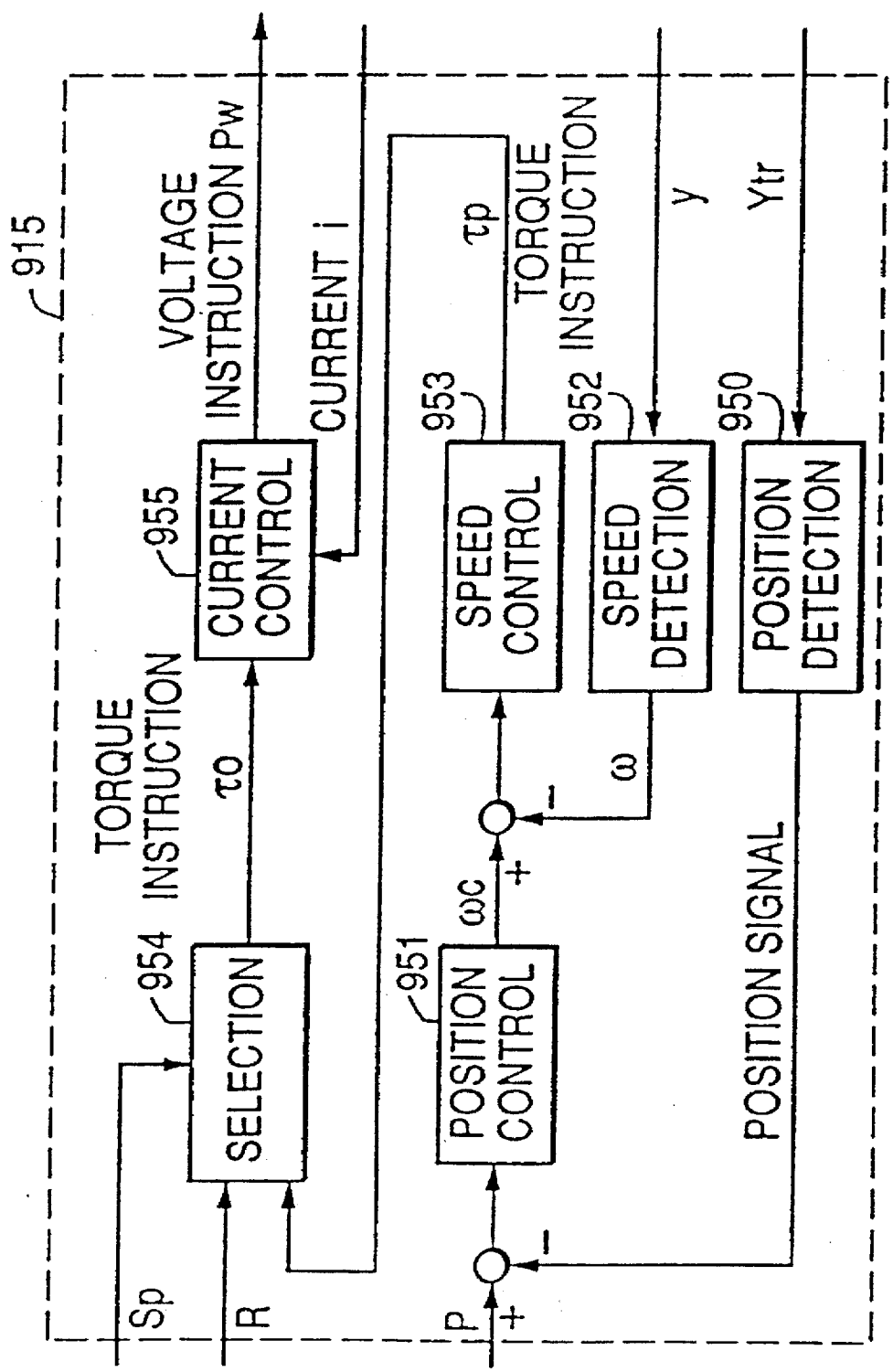
FIG. 14, is a schematic diagram of the motor control circuit shown in FIG. 11, and FIG. 15, is a schematic diagram of the motor control circuit shown in FIG. 11.
Figure 15:
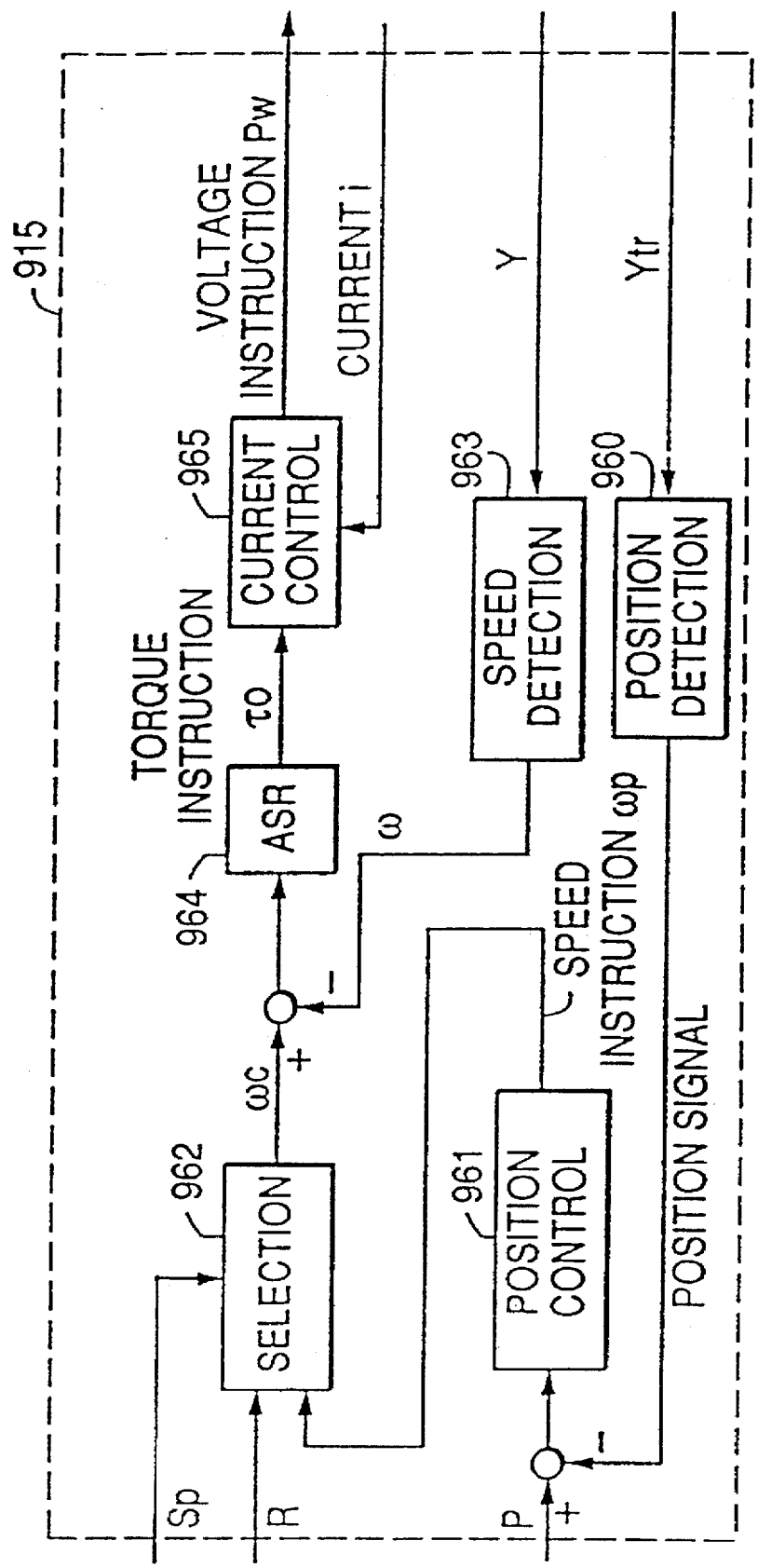

The position instruction generation circuit 912 calculates a position instruction value P in the manner shown in FIG. 13, and outputs to the motor control circuit 915. The motor control circuit 915 usually controls either the speed or torque of the motor 903 in response to the speed or torque instruction value R derived as shown in FIGS. 14 and 15; however, when position control is selected by the position control selection signal Sp, the position control for the wheels is performed according to the position instruction value P. As a result, the position of the vehicle can be controlled.

Figure 12:
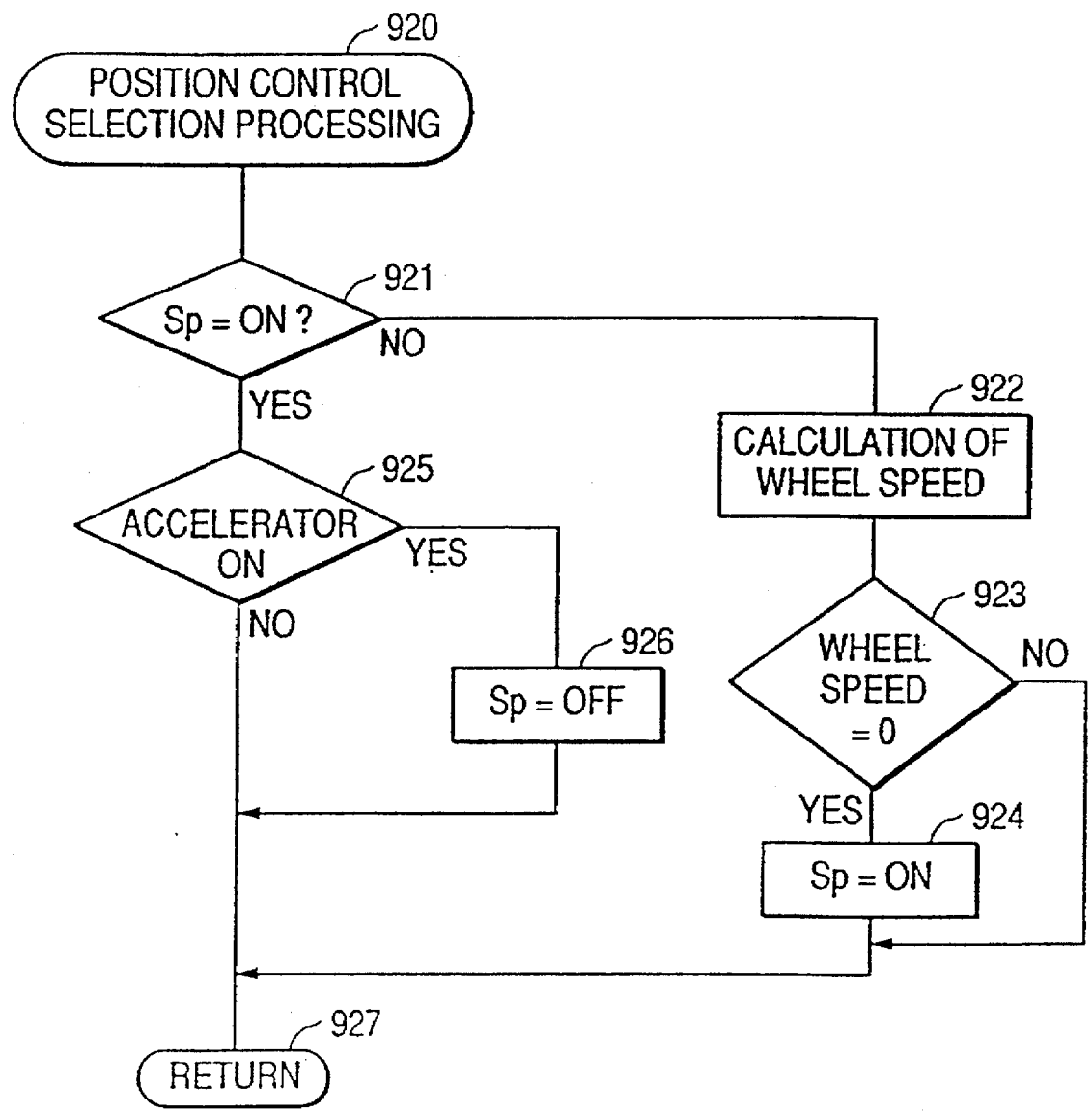
FIG. 12, is a flow chart which shows the processing in the position control selection circuit shown in FIG. 11.

FIG. 12 is a flow chart which shows the processing steps performed in the position control selection circuit 911. Processing is initiated at fixed intervals (step 920) by microcomputer operating system (OS). First, it is determined whether the signal Sp is ON (position control selected) or OFF (position control not selected). When position control is not ON, wheel speed is calculated from the encoder pulse signal Yt of the wheel (step 922), and it is determined whether the wheel speed is 0 (step 923). If wheel speed is 0 the position control selection signal Sp is set to ON (step 924), while if wheel speed is not 0, step 924 is bypassed and signal Sp remains OFF. When position control is ON in step 921, a determination is made whether the accelerator is ON (step 925), and if so the signal Sp is turned OFF to cancel position control (step 926). A return instruction (step 927) is then dispatched and a single iteration of the position control selection process is completed.

FIG. 13 is a flow chart which shows the processing steps executed in the position instruction generation circuit 912. Processing is initiated at fixed intervals (step 930) by microcomputer operating system (OS). A determination is first made whether the signal Sp output from the position control selection processing shown in FIG. 12 is ON (step 931), and if it is, a further determination is made whether the value Spp (the signal Sp at the previous sampling time) is OFF (step 932). When Spp is OFF, it can be concluded that the signal Sp has at that moment changed from OFF to ON, and a wheel position is then determined from the encoder pulse signal Ytr and output as the position instruction value P for position control (step 933).

Next, it is determined whether the traveling distance specification switch 913 is ON (step 934). (When the traveling distance specification switch 913 is pressed, the traveling distance specification signal SWp is turned ON, and the position instruction value P of the wheel is changed from the position where the vehicle stops, to a specified position several meters forward or backward.) When the signal SWp is ON, a further determination (step 705) is made whether SWpp (the value SWp at the previous sampling time) is OFF (step 935). When SWpp is OFF, (switch 913 was not depressed at the previous sampling) it can be concluded that the signal SWp has at that moment changed from OFF to ON. Thus, FLAG=1 is set, indicating automatic traveling (step 936); and when forward is selected by the mode signal MD from the forward/backward selection lever 914, the instruction A is added to the position instruction value P for position control, or when backward is selected, the instruction value A is subtracted from the position instruction value P (steps 937, 938, 939). (Here, the instruction value A represents a vehicle's moving by a specified distance.)

Next, it is queried whether FLAG=1 (that is, the vehicle is in the automatic traveling mode) (step 940). If so, when the brake is ON and wheel speed is 0, wheel position is calculated from the encoder pulse signal Ytr and output as the position instruction value P for position control (steps 941, 942). It is then determined whether the position instruction value P is equal to the current wheel position (step 943), and if so, automatic traveling is terminated, and FLAG=0 is set (step 944). The steps 940, 941, 942, 943, and 944 indicate that automatic traveling by position control is terminated when the vehicle is stopped by intensifying the braking force, and the vehicle travels a specified distance so that the position instruction value P and the wheel position becomes equal to each other. In step 945, the value of signal SWp is stored as the variable SWpp for next sampling, and in step 946, the signal Sp is stored as the variable Spp for next sampling. Then, a return instruction (step 947) is dispatched, and a single iteration of the position instruction output processing is completed.

FIG. 14 is the block diagram of the motor control circuit 915, which illustrates the case where the speed/torque instruction generation device 910 dispatches a torque instruction value R. In response to the encoder signal Ytr, position detection circuit 950 generates a wheel position signal which is compared with position instruction value P, and position control 951 is calculated to output a speed instruction value $\omega_C$. (The maximum value of the speed instruction is limited for safety reasons.) The motor speed $\omega$ received by speed detection circuit 952 from encoder signal Y is compared with the speed instruction value $\omega_C$, and the speed control 953 is calculated and the torque instruction value τP is output. When the position control selection signal Sp is ON, the switching circuit 954 outputs a torque instruction value τP as the torque instruction τ0, and when Sp is OFF, the torque instruction value R obtained from the speed/torque instruction generation device 910 is output as the torque instruction value τ0. Current control 955 receives the torque instruction vale τ0, as well as a value for the current i flowing to the induction motor 903, and generates a voltage control instruction in the form of pulses Pw.

FIG. 15 is a block diagram of motor control circuit 915, which is analogous to that of FIG. 14 except that in FIG. 15 the speed/torque instruction generation device 910 dispatches a speed instruction value R, as opposed to the torque instruction value in FIG. 14. The operation of the circuit as shown in FIG. 15 is similar to that of FIG. 14. That is, position detection circuit 960 generates a wheel position signal in response to the encoder signal Ytr. The wheel position signal is compared with the position instruction value P, and position control 961 is calculated to output a speed instruction value $\omega_P$. (The maximum value of the speed instruction is limited, for safety reasons.) When the position control selection signal Sp is ON, the selection circuit 962 outputs the speed instruction value $\omega_P$ as the speed instruction value $\omega_C$, and when SP is OFF, it outputs the speed instruction value R obtained from the speed/torque instruction generation device 910 as the speed instruction value $\omega_C$. The motor speed $\omega$ obtained by the speed detection 963 from the encoder signal Y, is compare with the speed instruction value $\omega_C$, and ASR section 964 calculates a torque instruction value τ0. Current control 965 receives the torque instruction value τ0, and a value for the current i flowing to the induction motor 903, and generates a voltage control instruction in the form of pulses PW.

By using the configuration shown in FIG. 11 and the processing shown in FIGS. 12, 13 14 and 15, when the vehicle stops the motor control is changed from torque control to position control, so that the position instruction conforms to the wheel position at the time when the vehicle stops. Thus, if an operator releases the brakes after the vehicle stops, the vehicle will be held there without moving backward and forward.

Although the encoder is fit to the left rear wheel to detect the vehicle position, it can be fit to another nondriven wheel, or multiple encoders can be used to control the vehicle position by detecting slip. If the traveling distance specification switch 913 is pressed during position control, the vehicle automatically moves forward or backward a specified distance, with its traveling speed restricted to a very low limit for safety reasons. Such automatic movement is terminated when the vehicle is stopped by intensifying the force applied to the brakes, whereupon the vehicle moves a specified distance and remains where automatic movement is terminated. If the operator presses the accelerator pedal during a stop or while moving by position control, position control is canceled, so that the vehicle can be restored to normal speed traveling or traveling by torque control.

The invention thus provides an electric vehicle which can be stopped at an arbitrary place, hold the stop position without the operator's operation of an auxiliary means, move from a stop position to a second, desired position which is a defined distance from the stop position, and then hold the latter position.

The vehicle is easy to start on a slope because it does not move from its stop position. It is also prevented from being pushed out when another vehicle collides with it. Finally, use of the automatic traveling function upon parking in a parking lot, facilitates parking.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Method of controlling operation of a vehicle propelled by a motor, comprising the steps of:

sensing a stop position of said vehicle where said vehicle comes to a stop; and maintaining the vehicle in said stop position by controlling torque of said motor.

2. Method according to claim 1 wherein said motor is an electric motor.

3. Method of controlling operation of a vehicle propelled by a motor, comprising the steps of:

determining a stop target position of said vehicle; and maintaining said vehicle in said stop target position by controlling torque of said motor.

4. Method according to claim 3 wherein said controlling step maintains said vehicle independent of a braking operation of said vehicle.

5. Method according to claim 3 wherein said motor is an electric motor.

6. Method according to claim 4 wherein said motor is an electric motor.

7. Method according to claim 1 wherein controlling torque of said motor comprises:

controlling a current flowing in said motor to maintain said vehicle stop position.

8. Method according to claim 7 wherein said motor is an electric motor.

9. Method according to claim 3 wherein controlling torque of said motor comprises:

controlling a current flowing in said motor to maintain said vehicle in said stop target position.

10. Method according to claim 9 wherein said motor is an electric motor.

11. Method of controlling operation of a vehicle propelled by a motor, comprising:

detecting a stop of said vehicle;

determining a stopped position of said vehicle at a time of said stop;

detecting magnitude of brake operation during a stopping period, following said stop and before commencement of movement of said vehicle;

controlling output torque of said motor as a function of detected magnitude of said brake operation, to a value sufficient to maintain said vehicle in said stopped position during said stopping period.

* * * * *